THOMAS ISHERWOOD.

Improvement in Loom Shuttles.

No. 4,522. Reissued Aug. 22, 1871.

WITNESSES.

J. P. McElroy

B. M. Woodbury

INVENTOR.

Thomas Isherwood per

Brown Brothers

Attorneys.

AM. PHOTO-LITHOGRAPHIC CO. N.Y. (OSBORNE'S PROCESS.)

UNITED STATES PATENT OFFICE.

THOMAS ISHERWOOD, OF STONINGTON, CONNECTICUT.

IMPROVEMENT IN LOOM-SHUTTLES.

Specification forming part of Letters Patent No. 115,614, dated June 6, 1871; reissue No. 4,522, dated August 22, 1871.

*To all whom it may concern:*

Be it known that I, THOMAS ISHERWOOD, of Stonington, in the county of New London and State of Connecticut, have invented certain new and useful Improvements in Loom-Shuttles, of which the following is a full, clear, and exact description, reference being had to the accompanying drawing forming part of this specification.

The object of the present invention is to prevent the formation of "floats," so called by weavers in weaving cloth. By floats are meant the defects in cloth, the result, in weaving, of the dislocation of a warp-thread or threads by its or their breakage, or of the entrance of waste or extraneous matter between the warps, preventing the formation of a proper shed for the passage of the shuttle, causing the shuttle in either case, while passing across the race-beam of the loom, to go over or under the estopped warps. In weaving cotton cloth these floats frequently occur, requiring much time and labor to pick them out. Under this invention the above result is secured by a combination, with the loom-shuttle, of a mechanism so constructed and arranged as, in either of the above-cited or equivalent cases, to be actuated, because of the then imperfect warp-shed, and from the movement of the shuttle through its race, to bind or restrain, or to otherwise cause, in the further movement of the shuttle, a severing of the weft-thread paid out or delivered from the shuttle, and thus to produce, through the ordinary stop-motion of the loom, an immediate stoppage of the loom.

Figure 1:
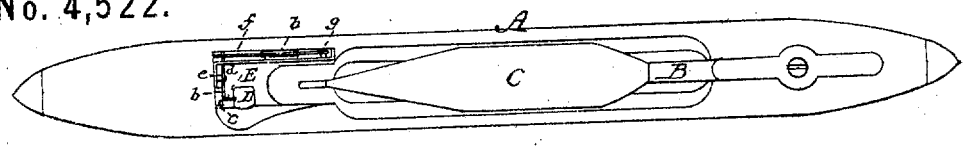
Figure 2:
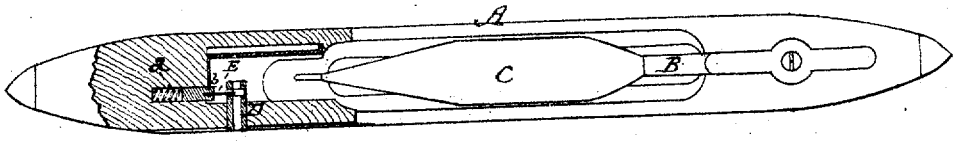
Figure 3:
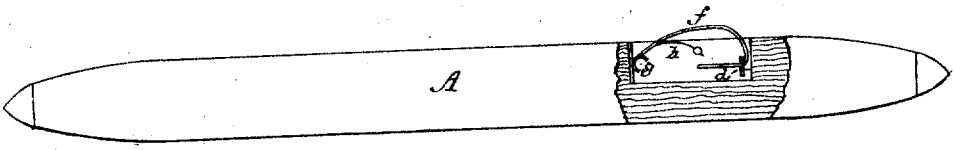
Figure 4:
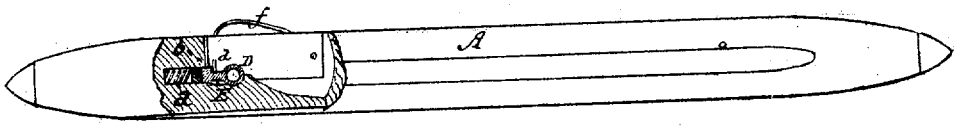
Figure 5:
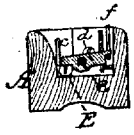

In the accompanying drawing my improvements in loom-shuttles are illustrated, Figure 1 being a top view of a shuttle with the same applied; Fig. 2 a horizontal section, Figs. 3 and 4 longitudinal sections, and Fig. 5 a transverse section of the shuttle through the portion thereof where my improvements are located.

A in the drawing represents the body of a loom-shuttle, B the spindle, C a cop on spindle B, and D the thread-eduction tube, arranged in the shuttle-body A, opening through one of its sides; E, a knife or clamp arranged within shuttle-body, so as to slide across the passage or bore of eduction-tube D, said knife or clamp being operated in its forward movement across the bore of eduction-tube by a spring, *a*, properly applied; *c*, an arm or finger-piece attached to knife or clamp E, for retracting or withdrawing, by the finger, the knife or clamp from the eduction-tube; *b*, a shoulder to knife or clamp, E; *d*, a latch or lever hung on a fulcrum, *e*, of the shuttle-body A, and located so that, by one of its ends, it can abut against the shoulder *b* of clamp E, to hold it in its retracted position—that is, out of or away from the bore of the eduction-tube D. The latch *d*, at its other end, is of a fork-shape, and interlocked with the free end of a bent or curved wire, *f*, arranged horizontally along the length, and to project above the upper surface of the shuttle, and to turn on a pivot, *g*, it being so held or retained by a spring, *h*, arranged and located therefor.

The mechanism hereinabove described, as applied to the shuttle, in case from either of the causes hereinabove recited, or other cause, a false or imperfect shed is formed, reducing thereby the angle of intersection of the warps from the travel of the shuttle through its race, is operated by the pressure of the warp on curved wire *f* depressing the same, and consequently turning the latch or lever *d* in a direction to release it from its abutment against the shoulder *b* of clamp or knife E, which then being free to move, by the action of its spring *a*, is driven forward into the bore of the eduction-tube D, against the weft-thread therein, binding, holding, or otherwise restraining said thread, so that, in the further movement of the shuttle, a severing or breaking of the thread will occur, causing thereby, through the ordinary stop-motion, an immediate stoppage of the loom, as is obvious to all conversant with weaving. In case the clamp E is made with a cutting-edge, when set free as described, the severing of the weft-thread may be caused instantly; whereas, when simply adapted to bind or restrain the passage of weft-thread through eduction-tube D, although its breakage or severing is insured, the weft-thread may "pay out" more or less, according to the degree which it is bound or restrained by the clamp before it is broken or severed. In lieu of arranging the clamp E or equivalent therefor to act substantially as described within the eduction-tube D, it may be arranged outside thereof, within the open portion of shuttle-body, or upon its outside face at the delivery end of eduction-tube, it being absolutely necessary that it should be located on the shuttle, in a position suitable, as the thread is paid out from the cop or spindle, to bind, hold, or restrain the same when actuated from the causes stated, or other equivalent cause.

In conclusion, it may be well to here observe that, from my arrangement of mechanism on the shuttle, the formation of floats in the weaving of cloth will be entirely prevented, as by its operation the loom is immediately stopped when from an imperfect warp-shed floats would be made in the cloth, for the attendant to remove the obstruction or repair the warps, as the case may require.

Having thus described my improvements in loom-shuttles, I shall state my claims, as follows:

1. The combination, with a loom-shuttle, of mechanism constructed, arranged, and operating substantially as described, for the purpose specified, viz., to sever the weft-thread to prevent floats.

2. The knife E, arranged to act within the eduction-tube D of the loom-shuttle, as set forth.

3. The knife or clamp E having operating spring *a* and shoulder *b*, lever or latch *d*, bent wire *f* having spring *h*, in combination with the eduction-tube D of a loom-shuttle, substantially as and for the purpose described.

The above specification of my invention signed by me this 30th day of June, A. D. 1871.

THOMAS ISHERWOOD.

Witnesses:
J. M. RIPLEY,
RUSSEL C. CHAMPLIN.